US011262750B2

(12) United States Patent
Ruckel et al.

(10) Patent No.: US 11,262,750 B2
(45) Date of Patent: Mar. 1, 2022

(54) SYSTEM AND METHOD FOR CONTROLLING TILTROTOR AIRCRAFT

(71) Applicant: Textron Innovations Inc., Providence, RI (US)

(72) Inventors: Paul David Ruckel, Fort Worth, TX (US); Jeremy Robert Chavez, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 158 days.

(21) Appl. No.: 16/585,920

(22) Filed: Sep. 27, 2019

(65) Prior Publication Data

US 2021/0096562 A1    Apr. 1, 2021

(51) Int. Cl.
*G05D 1/00*     (2006.01)
*B64C 29/00*    (2006.01)
*B64D 45/00*    (2006.01)

(52) U.S. Cl.
CPC ....... *G05D 1/0055* (2013.01); *B64C 29/0033* (2013.01); *B64D 45/0005* (2013.01); *B64D 2045/0085* (2013.01)

(58) Field of Classification Search
CPC .. G05D 1/0055; G05D 1/0858; G05D 1/0077; B64C 29/0033; B64C 27/80; B64C 13/503; B64C 27/52; B64C 13/16; B64C 5/02; B64C 9/00; B64D 45/0005; B64D 2045/0085
USPC .......................................................... 701/29
See application file for complete search history.

(56) References Cited

U.S. PATENT DOCUMENTS

| | | | |
|---|---|---|---|
| 6,270,038 B1* | 8/2001 | Cycon | B64C 27/20 244/12.2 |
| 7,731,121 B2* | 6/2010 | Smith | B64C 27/82 244/17.19 |
| 8,523,102 B2* | 9/2013 | Shue | G05B 23/0289 244/17.13 |
| 8,636,244 B2* | 1/2014 | Groninga | B64C 27/82 244/17.19 |
| 9,334,060 B2* | 5/2016 | Robertson | F02C 7/24 |
| 9,701,404 B2* | 7/2017 | Shue | G05B 23/0289 |

(Continued)

FOREIGN PATENT DOCUMENTS

WO    2010096104 A1    8/2010

*Primary Examiner* — Muhammad Shafi
(74) *Attorney, Agent, or Firm* — Slater Matsil, LLP

(57) ABSTRACT

In an embodiment, a method includes: adjusting a first flight control device of a rotorcraft to control flight around a first axis of the rotorcraft, the first flight control device exercising flight control authority around the first axis of the rotorcraft; detecting a failure of the first flight control device; transitioning at least a portion of the flight control authority around the first axis of the rotorcraft from the first flight control device to a second flight control device of the rotorcraft, the transitioning being performed automatically in response to detecting the failure of the first flight control device; and adjusting the second flight control device to control flight around the first axis of the rotorcraft, the second flight control device being adjusted by a first control process when the rotorcraft is in a first flight mode, the second flight control device being adjusted by a second control process when the rotorcraft is in a second flight mode.

23 Claims, 10 Drawing Sheets

(56) References Cited

U.S. PATENT DOCUMENTS

2018/0057157 A1\* 3/2018 Groninga .............. B64C 39/008
2018/0208305 A1\* 7/2018 Lloyd .................... B60L 50/61

\* cited by examiner

SYSTEM AND METHOD FOR CONTROLLING TILTROTOR AIRCRAFT

TECHNICAL FIELD

The present invention relates generally to rotorcraft, and, in particular embodiments, to a system and method for controlling rotorcraft.

BACKGROUND

A helicopter may include one or more rotor systems including one or more main rotor systems, anti-torque devices, thrusters, etc. A main rotor system generates aerodynamic lift to support the weight of the helicopter in flight and thrust to move the helicopter in forward flight. Helicopters are capable of vertical takeoff and landing (VTOL), but the main rotor system generates a large amount of aerodynamic drag, limiting the forward speed of the helicopter. Tiltrotor aircraft overcome the forward speed limits of helicopters. Tiltrotor aircraft include proprotors that may be positioned vertically or horizontally. As such, tiltrotor aircraft are capable of operating in a vertical flight mode, a forward flight mode, or a combination thereof.

SUMMARY

In an embodiment, a method includes: adjusting a first flight control device of a rotorcraft to control flight around a first axis of the rotorcraft, the first flight control device exercising flight control authority around the first axis of the rotorcraft; detecting a failure of the first flight control device; transitioning at least a portion of the flight control authority around the first axis of the rotorcraft from the first flight control device to a second flight control device of the rotorcraft, the transitioning being performed automatically in response to detecting the failure of the first flight control device; and adjusting the second flight control device to control flight around the first axis of the rotorcraft, the second flight control device being adjusted by a first control process when the rotorcraft is in a first flight mode, the second flight control device being adjusted by a second control process when the rotorcraft is in a second flight mode.

In some embodiments of the method, the first flight control device is a flight control surface disposed on an exterior of the rotorcraft. In some embodiments of the method, the flight control surface includes a ruddervator. In some embodiments of the method, the second flight control device is a propulsion assembly. In some embodiments of the method, the first flight mode is a vertical flight mode, and the second flight mode is a forward flight mode. In some embodiments of the method, detecting the failure of the first flight control device includes: accessing individualized equipment data for the rotorcraft, the individualized equipment data being stored at a computer of the rotorcraft; determining an expected performance of the first flight control device according to the individualized equipment data; measuring actual performance of the first flight control device during flight of the rotorcraft; and determining the first flight control device has failed in response to the actual performance of the first flight control device being less than the expected performance of the first flight control device. In some embodiments of the method, the individualized equipment data indicates the center of gravity of the rotorcraft, and the expected performance of the first flight control device is determined according to the center of gravity of the rotorcraft. In some embodiments of the method, the individualized equipment data indicates the weight of the rotorcraft, and the expected performance of the first flight control device is determined according to the weight of the rotorcraft. In some embodiments, the method further includes: collecting usage and maintenance data for the rotorcraft at the computer of the rotorcraft; sending the usage and maintenance data to a fleet management server; receiving the individualized equipment data from the fleet management server; and persisting the individualized equipment data at the computer of the rotorcraft. In some embodiments of the method, detecting the failure of the first flight control device includes: commanding the first flight control device to move to an expected position; measuring an actual position of the first flight control device after the commanding; and determining the first flight control device has failed in response to the actual position of the first flight control device being mismatched with the expected position of the first flight control device.

In an embodiment, a rotorcraft includes: a fuselage; a ruddervator mounted at an aft end of the fuselage; a plurality of propulsion assemblies mounted at a forward end of the fuselage; and a flight control computer coupled to the ruddervator and the propulsion assemblies, the flight control computer being configured to: adjust the ruddervator to control flight around a yaw axis and a pitch axis of the rotorcraft, the ruddervator exercising flight control authority around the yaw axis and the pitch axis of the rotorcraft; transition at least a portion of the flight control authority around the yaw axis of the rotorcraft from the ruddervator to the propulsion assemblies, the transitioning being performed automatically in response to detecting a failure of the ruddervator, the ruddervator retaining flight control authority around the pitch axis of the rotorcraft after the transition; and adjust the propulsion assemblies to control flight around the yaw axis of the rotorcraft, the propulsion assemblies being adjusted by a first control process when the rotorcraft is in a vertical flight mode, the propulsion assemblies being adjusted by a second control process when the rotorcraft is in a forward flight mode.

In some embodiments, the rotorcraft further includes: a configuration and maintenance computer coupled to the flight control computer, the configuration and maintenance computer being configured to: collect usage and maintenance data for the rotorcraft; send the usage and maintenance data to a fleet management server; receive individualized equipment data for the rotorcraft from the fleet management server; and persist the individualized equipment data. In some embodiments of the rotorcraft, the flight control computer is further configured to: access the individualized equipment data at the configuration and maintenance computer; determine an expected moment the ruddervator should produce around the yaw axis of the rotorcraft, the expected moment being determined according to the individualized equipment data for the rotorcraft; measure an actual moment the ruddervator produces around the yaw axis of the rotorcraft during flight of the rotorcraft; and determine the ruddervator has failed in response to the actual moment around the yaw axis of the rotorcraft being less than the expected moment around the yaw axis of the rotorcraft. In some embodiments of the rotorcraft, the individualized equipment data indicates the center of gravity of the rotorcraft, and the flight control computer is configured to determine the expected moment the ruddervator should produce around the yaw axis of the rotorcraft according to the center of gravity of the rotorcraft. In some embodiments of the rotorcraft, the individualized equipment data indicates the weight of the rotorcraft, and the flight control computer is configured to determine the expected moment the ruddervator should produce around the yaw axis of the rotorcraft according to the weight of the rotorcraft. In some embodiments of the rotorcraft, the flight control computer is further configured to: command the ruddervator to move to an expected position; measure an actual position of the ruddervator; and determining the ruddervator has failed in response to the actual position of the ruddervator being mismatched with the expected position of the ruddervator. In some embodiments of the rotorcraft, the propulsion assemblies include pylon assemblies, and during the first control process the flight control computer is configured to: adjust orientations of the pylon assemblies differentially. In some embodiments of the rotorcraft, the propulsion assemblies include proprotor assemblies, and during the second control process the flight control computer is configured to: adjust pitches of the proprotor assemblies differentially. In some embodiments of the rotorcraft, the flight control computer is configured to transition only a portion of the flight control authority exercised by the ruddervator to the propulsion assemblies. In some embodiments of the rotorcraft, the flight control computer is configured to transition all of the flight control authority exercised by the ruddervator to the propulsion assemblies.

In an embodiment, a rotorcraft includes: a ruddervator; a plurality of propulsion assemblies; a configuration and maintenance computer configured to store individualized equipment data for the rotorcraft; and a flight control computer coupled to the ruddervator, the propulsion assemblies, and the configuration and maintenance computer, the flight control computer being configured to: adjust the ruddervator to control flight around a first axis of the rotorcraft, the ruddervator exercising flight control authority around the first axis of the rotorcraft; detect a failure of the ruddervator according to the individualized equipment data for the rotorcraft; transition at least a portion of the flight control authority around the first axis of the rotorcraft from the ruddervator to the propulsion assemblies, the transitioning being performed automatically in response to detecting the failure of the ruddervator; and adjust the propulsion assemblies to control flight around the first axis of the rotorcraft, the propulsion assemblies being adjusted according to the individualized equipment data for the rotorcraft.

In some embodiments, the rotorcraft further includes: a temperature sensor coupled to the flight control computer; a pressure sensor coupled to the flight control computer; and an altitude sensor coupled to the flight control computer, where the flight control computer is configured to detect the failure of the ruddervator according to the individualized equipment data for the rotorcraft, a temperature value measured with the temperature sensor, a pressure value measured with the pressure sensor, and an altitude value measured with the altitude sensor. In some embodiments of the rotorcraft, the flight control computer is configured to adjust the propulsion assemblies according to the individualized equipment data for the rotorcraft, the temperature value measured with the temperature sensor, the pressure value measured with the pressure sensor, and the altitude value measured with the altitude sensor.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
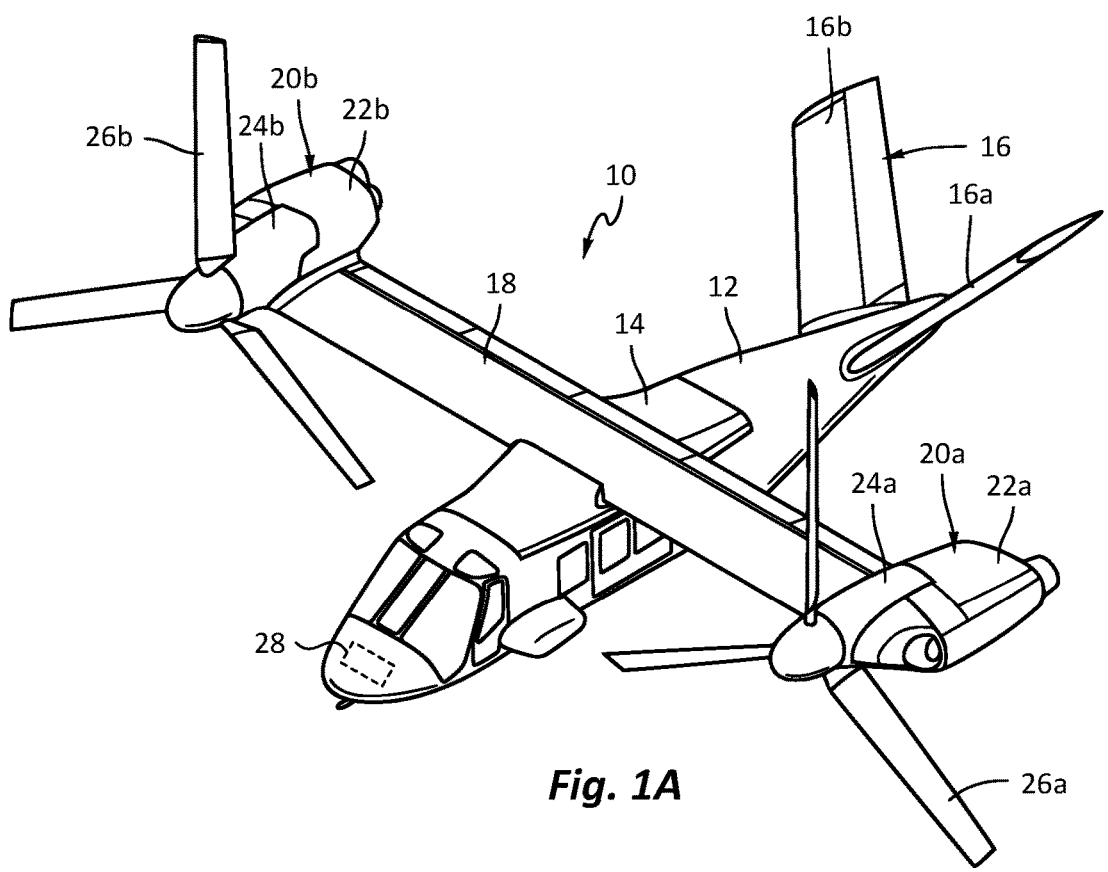
FIGS. 1A and 1B illustrate a tiltrotor aircraft, in accordance with some embodiments.
Figure 1B:
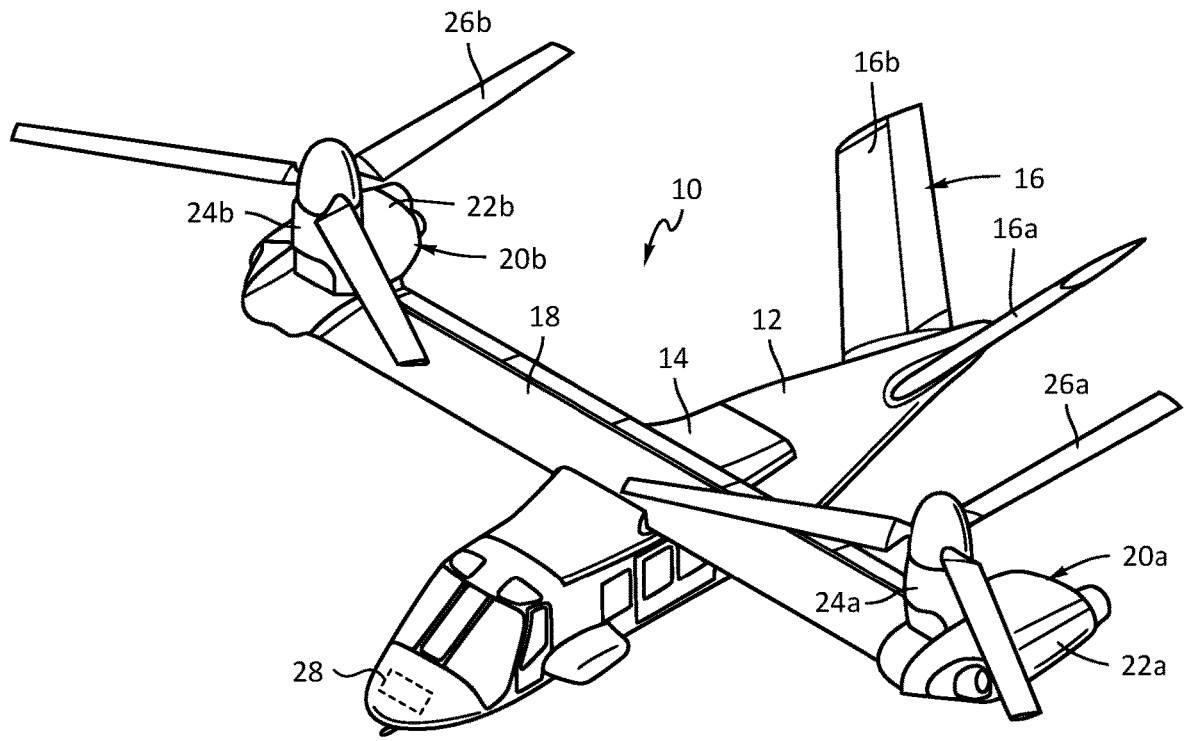

FIGS. 1A and 1B illustrate a rotorcraft 10, in accordance with some embodiments, and are described together. The rotorcraft 10 is a tiltrotor aircraft that operates in a forward flight mode (shown in FIG. 1A), a vertical flight mode (shown in FIG. 1B), or a conversion flight mode between vertical and forward flight modes (not shown). The rotorcraft 10 includes a fuselage 12, a wing mount assembly 14 that is rotatable relative to fuselage 12, and a tail assembly 16 mounted at an aft end of the fuselage 12. The fuselage 12 accommodates a crew, passengers, cargo, and/or the like.

Further, the fuselage 12 houses some components of the rotorcraft 10, such as displays, controls, instruments, computers, and the like. The wing mount assembly 14 supports a wing 18, which generates lift in forward flight. The tail assembly 16 may be any type of empennage. In some embodiments, the tail assembly 16 is a ruddervator. The tail assembly 16 includes rotatably mounted tail members 16a and 16b. The tail members 16a and 16b are flight control surfaces disposed on an exterior of the rotorcraft 10, with the flight control surfaces being operable for horizontal and/or vertical stabilization during forward flight. The tail members 16a and 16b can include flaperons, ailerons, the like, or combinations thereof. Together, the fuselage 12, wing mount assembly 14 tail assembly 16, and wing 18 (as well as their various frames, longerons, stringers, bulkheads, spars, ribs, skins and the like) form the airframe of the rotorcraft 10.

Propulsion assemblies 20a and 20b are fixed at the outboard ends of the wing 18. The propulsion assemblies 20a and 20b, respectively, include fixed nacelles 22a and 22b, pylon assemblies 24a and 24b, and proprotor assemblies 26a and 26b. The fixed nacelles 22a and 22b house an engine and a fixed portion of the drive system for the rotorcraft 10, and are positioned above the wing 18. The pylon assemblies 24a and 24b house a rotatable portion of the drive system for the rotorcraft 10, and are rotatable relative to the wing 18 and the fixed nacelles 22a and 22b. In particular, the pylon assemblies 24a and 24b may be rotated to a substantially vertical orientation (for forward flight, shown in FIG. 1A), a substantially horizontal orientation (for vertical flight, shown in FIG. 1B), or an orientation therebetween (for conversion flight mode). The proprotor assemblies 26a and 26b are affixed to the pylon assemblies 24a and 24b, and are rotatable responsive to torque and rotational energy provided by the engine and drive system. During all flight modes, the proprotor assemblies 26a and 26b rotate in opposite directions to provide torque balancing to the rotorcraft 10.

In forward flight mode (shown in FIG. 1A), the proprotor assemblies 26a and 26b rotate in a substantially vertical plane to provide a forward thrust enabling the wing 18 to provide a lifting force responsive to forward airspeed, allowing the rotorcraft 10 to fly in a manner similar to a propeller-driven airplane. In vertical flight mode (shown in FIG. 1B), the proprotor assemblies 26a and 26b rotate in a substantially horizontal plane to provide a lifting thrust, allowing the rotorcraft 10 to fly in a manner similar to a helicopter. It should be appreciated that rotorcraft 10 may also be operated in a conversion mode, where the proprotor assemblies 26a and 26b are selectively positioned between the horizontal and vertical planes. Further, although the rotorcraft 10 has been described as having one engine in each of the fixed nacelles 22a and 22b, it should be appreciated that other propulsion system arrangements are possible. For example, the rotorcraft 10 may include a single engine providing torque and rotational energy to both of the proprotor assemblies 26a and 26b. The single engine may be housed in the fuselage 12, one of the fixed nacelles 22a or 22b, or the like.

The rotorcraft 10 further includes rotorcraft computers 28. In the embodiment shown, the rotorcraft computers 28 are housed in the fuselage 12, although it should be appreciated that the rotorcraft computers 28 may be located anywhere. Further, the rotorcraft computers 28 may be located in a centralized location or distributed throughout the rotorcraft 10. One or more systems (discussed further below) within the rotorcraft 10 may be partially or wholly embodied on the rotorcraft computers 28 as software and/or hardware for performing any functionality described herein.

Figure 2:
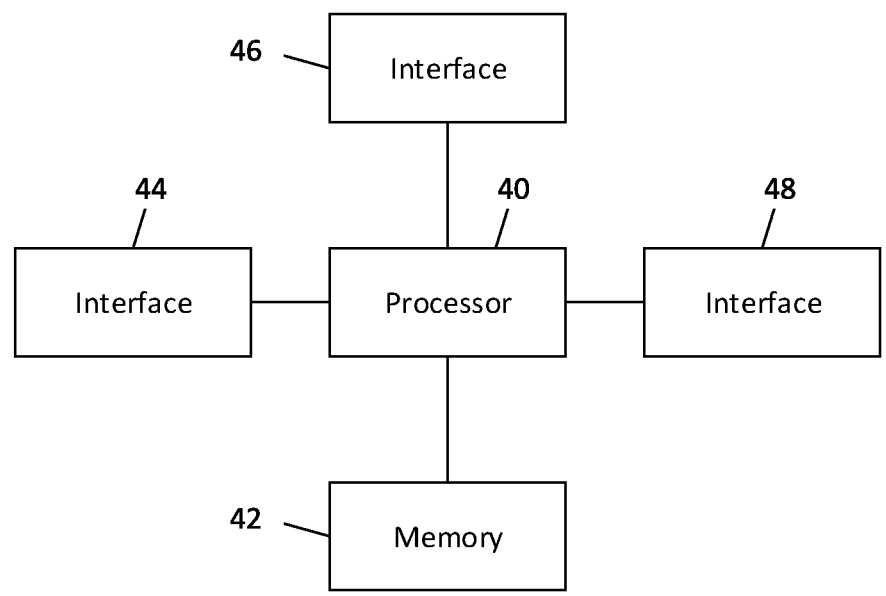
FIG. 2 is a block diagram of a rotorcraft computer, in accordance with some embodiments.

FIG. 2 is a block diagram of a rotorcraft computer 28, in accordance with some embodiments. As shown, the rotorcraft computers 28 include a processor 40, a memory 42, and interfaces 44-48, which may (or may not) be arranged as shown. The processor 40 may be any component or collection of components adapted to perform computations and/or other processing related tasks, and the memory 42 may be any component or collection of components adapted to store programming and/or instructions for execution by the processor 40. In an embodiment, the memory 42 includes a non-transitory computer readable medium. The interfaces 44, 46, 48 may be any component or collection of components that allow the rotorcraft computers 28 to communicate with other devices/components and/or a user. For example, one or more of the interfaces 44, 46, 48 may be adapted to communicate data, control, or management messages from the processor 40 to applications installed on the host device and/or a remote device. As another example, one or more of the interfaces 44, 46, 48 may be adapted to allow a user or user device (e.g., personal computer (PC), etc.) to interact/communicate with the rotorcraft computers 28. The rotorcraft computers 28 may include additional components not depicted, such as long term storage (e.g., non-volatile memory, etc.).

Figure 3A:
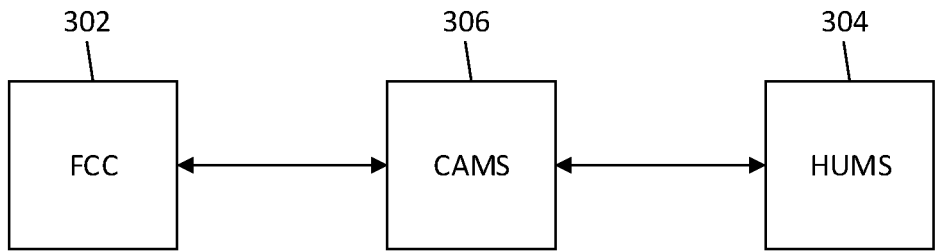
FIG. 3A is a block diagram of systems of a rotorcraft, in accordance with some embodiments.

FIG. 3A is a block diagram of systems of the rotorcraft 10, in accordance with some embodiments. The systems include a flight control system 302, a health and usage monitoring system (HUMS) 304, and a configuration and maintenance system (CAMS) 306. The rotorcraft 10 may include other systems, or may omit some of the illustrated systems. Elements of the illustrated systems are implemented at least partially by the rotorcraft computers 28. In some embodiments, the rotorcraft computers 28 include multiple computers that each perform dedicated tasks for one of the systems.

The flight control system 302 is operable to control flight of the rotorcraft 10, and is embodied on flight control computers (FCCs). In some embodiments, the rotorcraft 10 is a fly-by-wire rotorcraft. In such embodiments, the flight control system 302 is operable to execute one or more control laws (CLAWS) that control flight of the rotorcraft 10. In some embodiments, the flight control system 302 is implemented as a series of inter-related feedback loops running certain control laws. The loops include inner stabilization and rate augmentation loops, and outer guidance and tracking loops that are separated from the inner loops. The control laws running in the loops allow for decoupling of otherwise coupled flight characteristics, which in turn provide for more stable flight characteristics and reduced pilot workload. The control loops control flight of the rotorcraft 10 according to signals received from sensors. The sensors include pilot flight control sensors, airspeed sensors, altitude sensors, attitude sensors, position sensors, orientation sensors, temperature sensors, airspeed sensors, or the like. Filters may be applied by the control loops to the signals received or obtained from the sensors. The filters are defined by parameters such as the filter gains, center frequencies, widths, the like, and help stabilize flight control of the rotorcraft 10.

The HUMS 304 is operable to monitor the health and operating conditions of the rotorcraft 10. The HUMS 304 performs data collection and analysis with signals received from sensors, e.g., during flight. The sensors are located on critical (or non-critical) components of the rotorcraft 10, such as on the engine and drive system. The sensors gather data relating to parameters of the monitored components and provide the data to the HUMS 304. The data obtained by the sensors is typically in an analog format, and is converted into a digital format or signal. The HUMS 304 may analyze the signals, or may store the signals and later transfer them to a ground station for operator analysis. For example, if the rotorcraft 10 experiences a high drive shaft torque loading over a certain period of time, the HUMS 304 acquires the relevant data from the sensors for analysis such that timely inspection and/or maintenance of bearings or other rotorcraft systems can be performed. In some embodiments, the HUMS 304 also performs self-testing of the rotorcraft 10, where the HUMS 304 tests different systems of the rotorcraft 10 and analyzes sensor feedback to determine whether those systems have any potential issues that should be investigated. Self-testing may be performed automatically by the HUMS 304 and the results may be stored for later retrieval, e.g., by a maintenance crew.

Figure 3B:
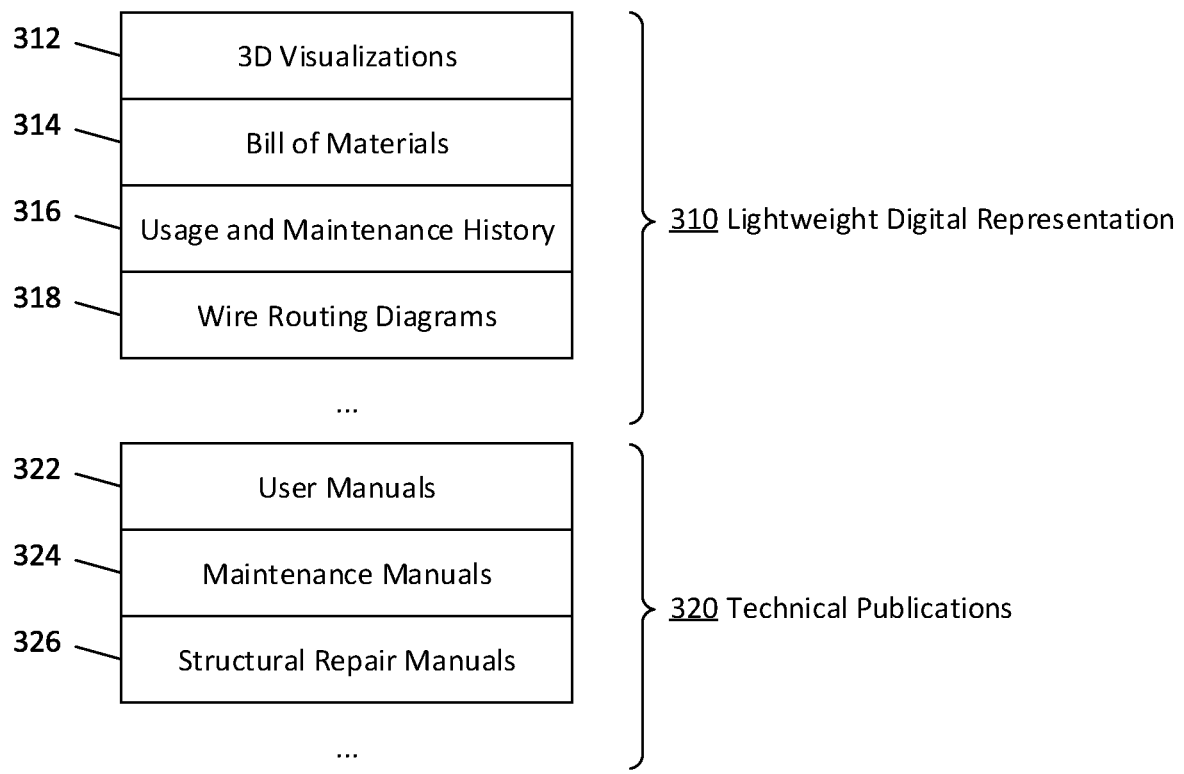
FIG. 3B illustrates a data structure for individualized equipment data, in accordance with some embodiments.

The CAMS 306 is operable to store individualized equipment data for the rotorcraft 10. FIG. 3B illustrates a data structure for the individualized equipment data, in accordance with some embodiments. The individualized equipment data includes a lightweight digital representation 310 of the rotorcraft 10 and technical publications 320 for the rotorcraft 10.

The lightweight digital representation 310 of the rotorcraft 10 is a collection of configuration and usage data for the rotorcraft 10. The lightweight digital representation 310 includes three-dimensional (3D) visualizations 312 for the rotorcraft 10, a bill of materials (BOM) 314 for the rotorcraft 10, usage and maintenance history 316 of the rotorcraft 10, wire routing diagrams 318 for the rotorcraft 10, and the like. The 3D visualizations 312 include meshes, materials, shaders, textures, and the like for rendering a 3D view of the rotorcraft 10 or its components. The BOM 314 is a list of components and the quantities of each in the rotorcraft 10. Examples of components include raw materials, sub-assemblies, intermediate assemblies, sub-components, pails, and the like. The 3D visualizations 312 include visualizations or models for each component listed on the BOM 314. The usage and maintenance history 316 includes maintenance logs and usage logs for the rotorcraft 10. The maintenance logs track each maintenance task performed on the rotorcraft 10. The usage logs track samples from sensors of the rotorcraft 10 during usage. The maintenance logs and usage logs include data for the entire lifetime of the rotorcraft 10, e.g., going back to the manufacture date of the rotorcraft 10. The lightweight digital representation 310 is customized and specific to the tail number of the rotorcraft 10, and is generated based on manufacturing data, maintenance data, and usage data of the rotorcraft 10.

The technical publications 320 are manuals for the rotorcraft 10. The technical publications 320 include user manuals 322, maintenance manuals 324, structural repair manuals 326, and the like. In some embodiments, the technical publications 320 are flat documents that may be viewed on a display or as printed documents. The flat documents may include two-dimensional (2D) views of the rotorcraft 10. In some embodiments, the technical publications 320 are interactive documents that may be viewed on a tablet, headset, or the like. The interactive documents may include 3D views of the rotorcraft 10 that are rendered on a viewing device. The views (2D or 3D) for the technical publications 320 may be rendered using the lightweight digital representation 310. The technical publications 320 are customized and specific to the tail number of the rotorcraft 10, and may be generated based on the lightweight digital representation 310 of the rotorcraft 10.

The illustrated systems of the rotorcraft 10 may communicate with one another. In some embodiments, the CAMS 306 communicates with and controls the flight control system 302. For example, the CAMS 306 may reconfigure the flight control system 302 according to the lightweight digital representation of the rotorcraft 10. Likewise, the flight control system 302 may access the individualized equipment data at the CAMS 306 and reconfigure flight control based on data in the individualized equipment data. In some embodiments, the CAMS 306 communicates with and receives data from the HUMS 304. For example, sensor signals and self-test results may be obtained from the HUMS 304, and may be analyzed to determine health and usage data for the rotorcraft 10.

Figure 4:
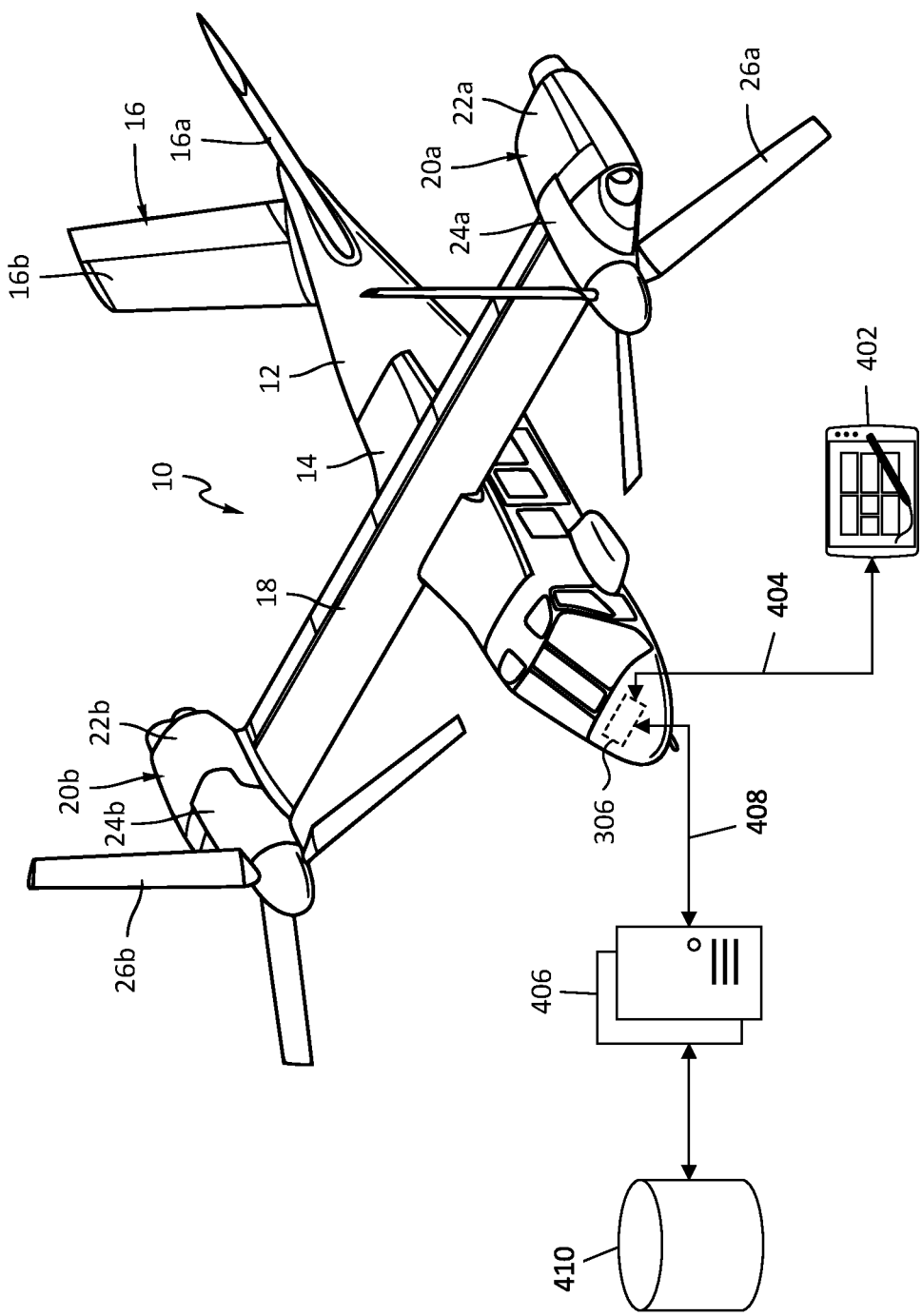
FIG. 4 illustrates a rotorcraft maintenance system, in accordance with some embodiments.

FIG. 4 illustrates a rotorcraft maintenance system 400, in accordance with some embodiments. In the rotorcraft maintenance system 400, a user (such as a maintenance crew member) interacts with the CAMS 306 using a remote terminal 402. Further, the CAMS 306 communicates with one or more fleet management servers 406.

The remote terminal 402 may be a tablet, headset, personal computer, or the like, and may communicate with the CAMS 306 over a connection 404. The connection 404 may be a wired or wireless connection, such as an Ethernet connection, a Wi-Fi connection, a Bluetooth connection, or the like. In some embodiments, the remote terminal 402 is paired with one rotorcraft 10, and interacts with the CAMS 306 corresponding to the paired rotorcraft 10. The remote terminal 402 may be used to perform several operations with the CAMS 306. Examples of such operations include viewing the technical publications for the rotorcraft 10, viewing the lightweight digital representation of the rotorcraft 10, entering maintenance records for the rotorcraft 10, and the like.

When viewing technical publications or the lightweight digital representation of the rotorcraft 10, the individualized equipment data is streamed from the CAMS 306 to the remote terminal 402. Viewing the technical publications may include displaying text from the publications, and rendering views to accompany the text using the 3D visualizations for the rotorcraft 10. Viewing the lightweight digital representation may include viewing the BOM and 3D visualizations for the rotorcraft 10. The remote terminal 402 is a thin client that may be used to view the individualized equipment data for the rotorcraft 10, without persisting the individualized equipment data in the long-term. By storing the individualized equipment data on the CAMS 306, and not on the remote terminal 402, the individualized equipment data may more easily follow the rotorcraft 10, and may be accessed regardless of whether a given remote terminal 402 is available.

Maintenance records for the rotorcraft 10 may be entered using the remote terminal 402. A maintenance crew may enter records when performing maintenance on the rotorcraft 10. For example, when a given part of the rotorcraft 10 is replaced, the remote terminal 402 may be used to record the replacement in the CAMS 306. The new maintenance records may be temporarily stored on the CAMS 306 for transfer to the fleet management servers 406. Maintaining maintenance records for the rotorcraft 10 may be required by law, and entering such records in the CAMS 306 as the maintenance crew works may help ensure regulatory compliance.

The CAMS 306 also communicates with fleet management servers 406 during operation. The fleet management servers 406 may update the individualized equipment data for the rotorcraft 10 based on usage and maintenance data from the CAMS 306, and may send the updated individualized equipment data back to the rotorcraft 10 for storage on the CAMS 306. In some embodiments, the fleet management servers 406 aggregate the usage and maintenance data of multiple rotorcraft 10 in a fleet of rotorcraft, and update the individualized equipment data for the rotorcraft 10 based on the aggregated usage and maintenance data. The usage and maintenance data may include health and usage data collected by the HUMS 304 and maintenance records stored at the CAMS 306. The CAMS 306 communicates with the fleet management servers 406 over a connection 408. The connection 408 may be a wired or wireless connection, such as an Ethernet connection, a Wi-Fi connection, a cellular connection, a satellite link, an aircraft communications addressing and reporting system (ACARS) link, or the like. The individualized equipment data may be stored in a location accessible to the fleet management servers 406, such as in a database 410. The database 410 may be a relational database, such as a structured query language (SQL) database, or may be a non-relational database, such as a key-value store.

In some embodiments, the fleet management servers 406 and database 410 are located on a network operated by a single entity. For example, the network may be operated by the owner or maintainer of the rotorcraft 10, or by the manufacturer of the rotorcraft 10. The same set of fleet management servers 406 may perform both the aggregation of fleet data and the updating of individualized equipment data for the fleet.

In some embodiments, the fleet management servers 406 include servers located on networks operated by different entities. For example, the networks may include a front-end network (containing front-end fleet management servers) and a back-end network (containing back-end fleet management servers), which may be separated by a firewall. In such an example, the front-end network may be operated by the owner or maintainer of the rotorcraft 10, and the back-end network may be operated by the manufacturer of the rotorcraft 10. The database 410 may be located on the back-end network with the back-end fleet management servers. The front-end fleet management servers perform a subset of functions, and the back-end fleet management servers perform a different subset of functions. In particular, the front-end fleet management servers may perform the aggregation of fleet data, and the back-end fleet management servers may perform the updating of individualized equipment data for the fleet.

Figure 5:
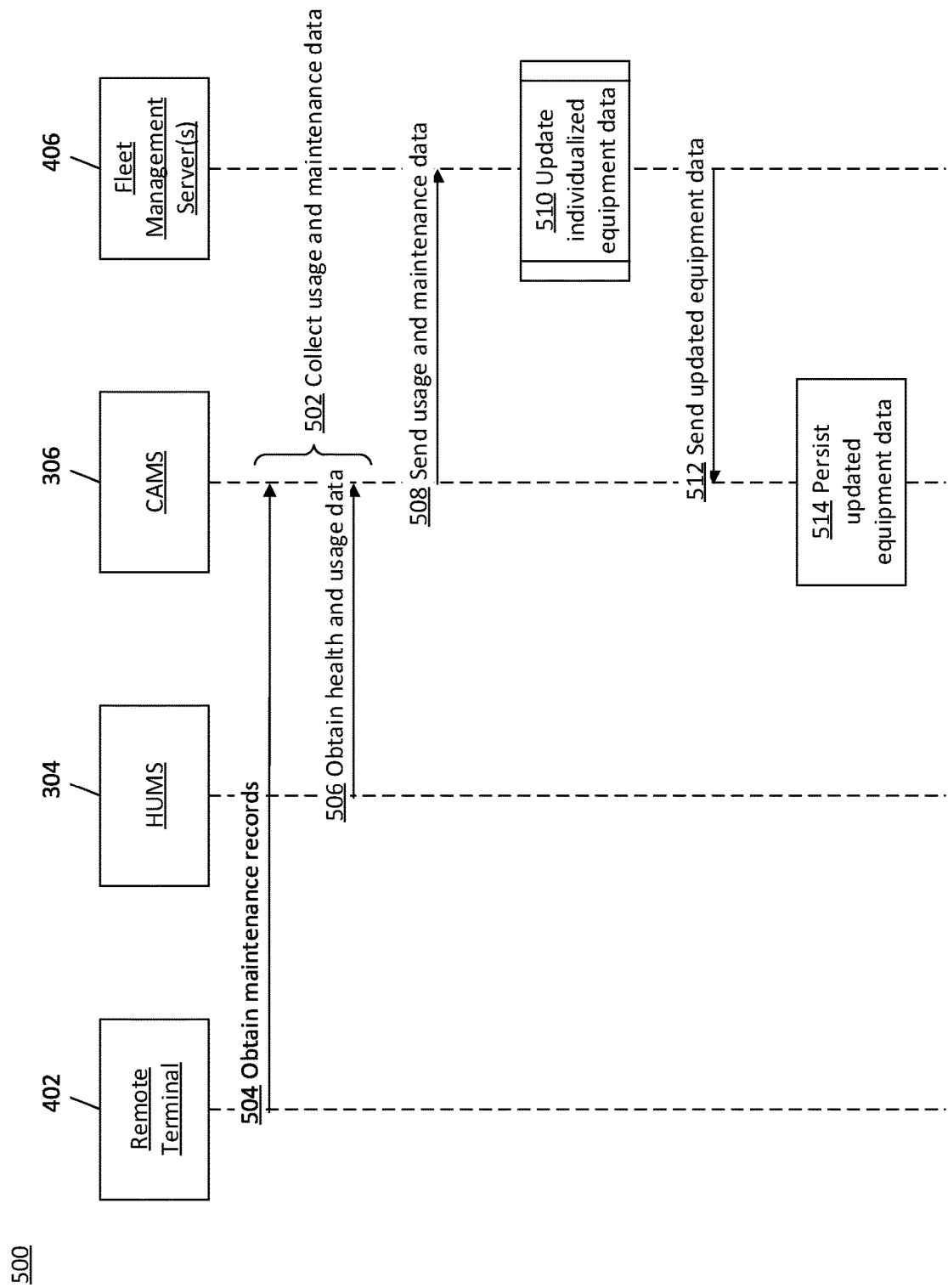
FIG. 5 is a protocol diagram showing operations when updating individualized equipment data for a rotorcraft, in accordance with some embodiments.

FIG. 5 is a protocol diagram 500 showing operations when updating individualized equipment data for the rotorcraft 10, in accordance with some embodiments. Operations shown in the protocol diagram 500 may be performed periodically, or in response to a user requesting updated equipment data, e.g., with the remote terminal 402. In some embodiments, the operations are performed automatically in response to a particular event, such as in response to the connection 408 being established or restored.

The CAMS 306 collects usage and maintenance data for the rotorcraft 10 (step 502). In the embodiment shown, the CAMS 306 collects the usage and maintenance data by obtaining maintenance records, such as those entered by a maintenance crew with the remote terminal 402 (step 504) and by obtaining health and usage data from the HUMS 304 (step 506). The usage and maintenance data may not include all historic data for the rotorcraft 10, but rather may be data about the health status, usage, and maintenance of the rotorcraft 10 since the last update of the individualized equipment data.

The CAMS 306 sends the collected usage and maintenance data to the fleet management servers 406 (step 508). The maintenance records, usage, and self-test data may be temporarily stored on the CAMS 306 and then sent to the fleet management servers 406 when data collection is completed. In embodiments where the fleet management servers 406 are located on a front-end and a back-end network, the usage and maintenance data is sent to the front-end fleet management servers and is then forwarded to the back-end fleet management servers. In embodiments where the fleet management servers 406 are located on a network operated by a single entity, the forwarding step may be omitted. In some embodiments, the usage and maintenance data is collected by the CAMS 306 and is sent to the fleet management servers 406 periodically. For example, aggregated data may be forwarded at a regular time interval. The aggregated data may be forwarded in a single request, to reduce the total quantities of round trips to the fleet management servers 406.

The fleet management servers 406 update the individualized equipment data for the rotorcraft 10 (step 510). The fleet management servers 406 obtain the current individualized equipment data by retrieving it from the database 410 based on the tail number of the rotorcraft 10. The individualized equipment data (e.g., the technical publications and the lightweight digital representation) for the rotorcraft 10 is then updated (discussed further below) according to the received usage and maintenance data from the CAMS 306. The updating may also be performed according to proprietary information accessible to the fleet management servers 406, such as design and manufacturing data for the rotorcraft 10. Updating the individualized equipment data allows it to accurately reflect the state of the rotorcraft 10 as it is maintained at any given point in time. The updated individualized equipment data is then persisted in the database 410.

The fleet management servers 406 then send a copy of the updated individualized equipment data to the CAMS 306 (step 512). In embodiments where the fleet management servers 406 are located on a front-end and a back-end network, the updated individualized equipment data is sent to the front-end fleet management servers and is then forwarded to the CAMS 306. In embodiments where the fleet management servers 406 are located on a network operated by a single entity, the forwarding step may be omitted. In some embodiments, the updated individualized equipment data is sent in its entirety to the CAMS 306. In some embodiments, differences between the old and updated individualized equipment data are determined, and the differences are sent to the CAMS 306. Some portions of the lightweight digital representation (such as the 3D visualizations) may be large in size. Sending the updated individualized equipment data to the CAMS 306 by sending differences between the old and updated data may reduce the bandwidth consumed by the fleet management servers 406. The CAMS 306 persists the received individualized equipment data (step 514). The individualized equipment data may be stored on, e.g., the memory 42 of the rotorcraft computers 28.

Figure 6:
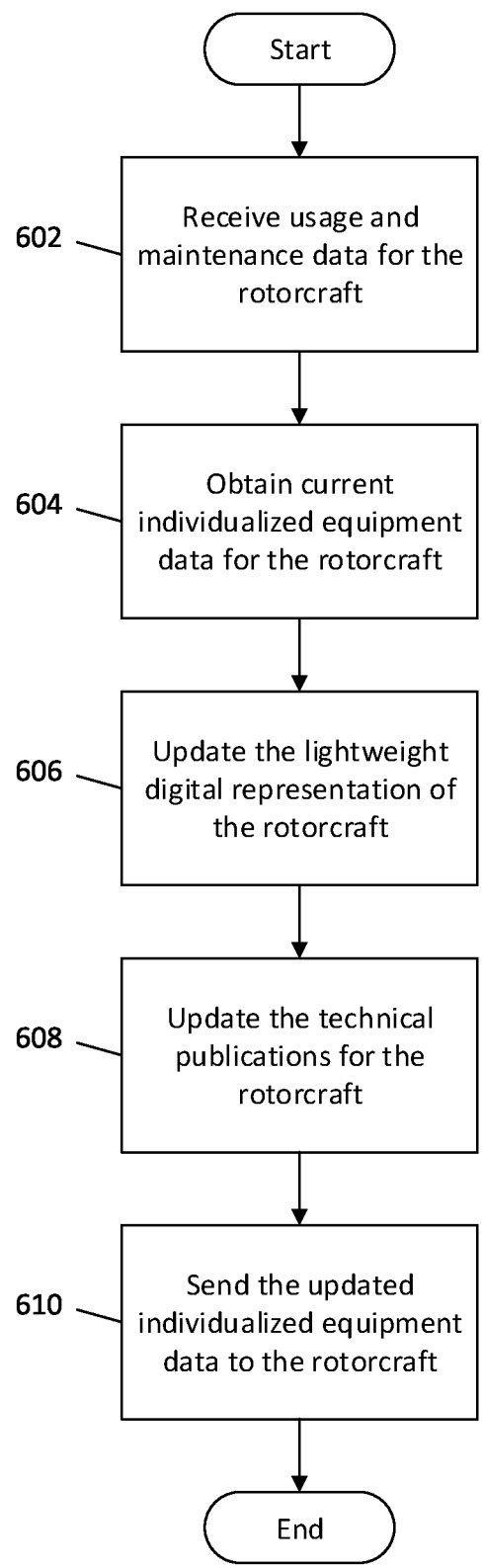
FIG. 6 is a flow diagram of a method for updating individualized equipment data for a rotorcraft, in accordance with some embodiments.

FIG. 6 is a flow diagram of a method for updating the individualized equipment data for a rotorcraft 10, in accordance with some embodiments. The illustrated steps may be performed by the fleet management servers 406 during step 510 of the protocol diagram 500 (see FIG. 5).

The usage and maintenance data for the rotorcraft 10 is received (step 602). The usage and maintenance data is received from the CAMS 306 of the rotorcraft 10. Continuing the above example, the usage and maintenance data may include health and usage data collected by the HUMS 304 of the rotorcraft 10, and maintenance records stored at the CAMS 306 of the rotorcraft 10.

The current individualized equipment data for the rotorcraft 10 is obtained (step 604). The data from the CAMS 306 may include the tail number of the rotorcraft 10. The database 410 may include individualized equipment data for multiple rotorcraft, indexed with the tail number of each rotorcraft. The fleet management servers 406 obtain the current individualized equipment data by retrieving it from the database 410, e.g., by using the tail number of the rotorcraft 10 as the searching key.

The lightweight digital representation of the rotorcraft 10 is updated (step 606). The lightweight digital representation is updated according to the usage and maintenance data received from the CAMS 306. In particular, the BOM, 3D visualizations, wire routing diagrams, and usage and maintenance history of the rotorcraft 10 may all be updated according to the usage and maintenance data. For example, when a component of the rotorcraft 10 is replaced, the BOM may be changed to reflect the new component, and the 3D visualizations may be updated to replace the visualization(s) of the old component with the visualization(s) of the new component. The lightweight digital representation may thus reflect the most recent as-maintained configuration of the rotorcraft 10.

The 3D visualizations are updated based on the updated BOM. The 3D visualizations may be updated based on the design and manufacturing data stored in the database 410. The design and manufacturing data may be, e.g., computer-aided design (CAD), computer-aided manufacturing (CAM), and/or computer-aided engineering (CAE) source files for the rotorcraft 10. For example, the source files may be for a system such as Dassault Systèmes CATIA, Siemens NX, or the like. The design and manufacturing data may be stored in the database 410, or stored in another (separate) database. Some portions of the 3D visualizations, such as the materials, shaders, and textures, may be generated or updated based on the design and manufacturing data, in combination with the usage and maintenance data. For example, the design and manufacturing data may indicate that a particular new component is beige and formed from rubber, and so the 3D visualization for the new component is generated having materials, shaders, and textures that render as beige rubber on the remote terminal 402. The components may be originally defined as solid models in a CAD system, and mesh-based 3D visualizations are produced based on the solid models and the design and manufacturing data.

The technical publications for the rotorcraft 10 are updated (step 608). The technical publications are updated according to the updated lightweight digital representation of the rotorcraft 10. In particular, the user manuals, maintenance manuals, and structural repair manuals may be updated (discussed further below) in view of the changes in the BOM, 3D visualizations, and/or wire routing diagrams of the rotorcraft 10. The views of the technical publications are updated based on the updated 3D visualizations. The technical publications may thus reflect the most recent as-maintained configuration of the rotorcraft 10.

After steps 606 and 608, the updated individualized equipment data includes the updated technical publications and the updated lightweight digital representation. The updated individualized equipment data is sent to the rotorcraft 10 (step 610). The updated individualized equipment data is sent to the CAMS 306 of the rotorcraft 10 and persisted. The updated individualized equipment data is also persisted at the fleet management servers 406, e.g., by updating the individualized equipment data for the rotorcraft 10 in the database 410.

Figure 7A:
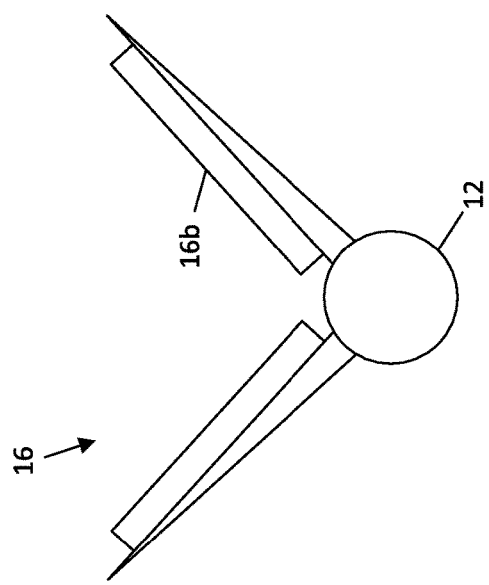
FIGS. 7A, 7B, 7C, and 7D show tail member positions for controlling flight around various axes of the rotorcraft, in accordance with some embodiments.
Figure 7B:
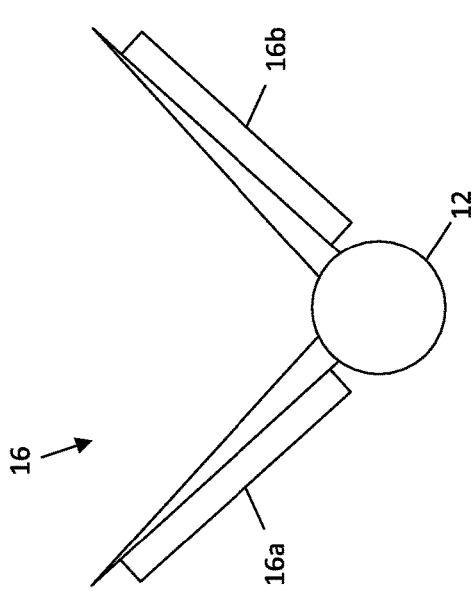
Figure 7C:
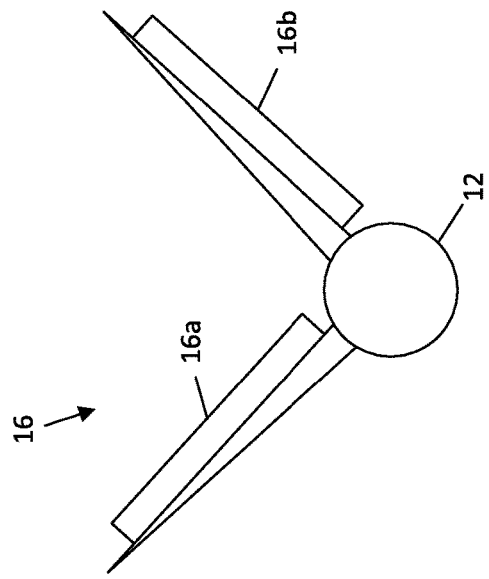
Figure 7D:
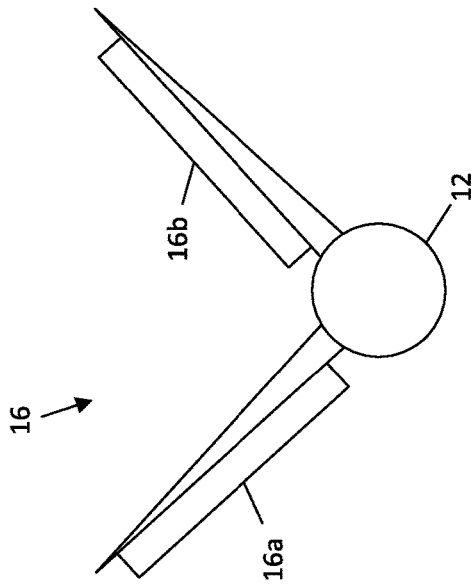

During forward flight, the tail assembly 16 is ordinarily used to control flight around the principal axes (e.g., yaw, pitch, and roll) of the rotorcraft 10. The principal axes move with the rotorcraft 10 relative to the Earth, along with the craft, during flight. FIGS. 7A through 7D show positions of the tail members 16a and 16b for controlling flight around the principal axes of the rotorcraft 10. FIGS. 7A through 7D are views from behind the rotorcraft 10. In FIG. 7A, the tail members 16a and 16b are positioned to pitch the nose of the rotorcraft 10 upwards. In FIG. 7B, the tail members 16a and 16b are positioned to pitch the nose of the rotorcraft 10 downwards. In FIG. 7C, the tail members 16a and 16b are positioned to yaw the nose of the rotorcraft 10 to the right. In FIG. 7D, the tail members 16a and 16b are positioned to yaw the nose of the rotorcraft 10 to the left. In the embodiments shown, the tail members are part of a ruddervator on a v-tail assembly, and operate by directing airflow over the tail section during forward flight. As discussed further below, flight control authority over one or more axes of the rotorcraft 10 may be transitioned from the tail members 16a and 16b. Because a ruddervator mixes pitch and yaw control, control over one or more axes may be mixed out of control signals sent to the tail members 16a and 16b.

In addition to using the tail assembly 16, the pitch of the rotorcraft 10 may also be controlled by differentially changing the orientations of the propulsion assemblies 20a and 20b (see FIGS. 1A and 1B), and the yaw of the rotorcraft 10 may also be controlled by differentially changing the collective or cyclic pitch of the proprotor assemblies 26a and 26b. Controlling principal axis motion of the rotorcraft 10 with the tail assembly 16 can be preferable in some situations. However, in some situations (e.g., during combat), damage may occur to the rotorcraft 10. According to some embodiments, the propulsion assemblies 20a and 20b and/or the proprotor assemblies 26a and 26b are used for fallback principal axis motion control when the tail assembly 16 of the rotorcraft 10 is damaged.

In some embodiments, the propulsion assemblies 20a and 20b are controlled according to the individualized equipment data stored at the CAMS 306 of the rotorcraft 10. The lightweight digital representation 310 (see FIG. 3B) stored at the CAMS 306 (see FIG. 3A) indicates the gross weight and center-of-gravity (COG) of the rotorcraft 10. As discussed further below with respect to FIG. 9, the principal axis motion of the rotorcraft 10 may be more accurately controlled when the orientations of the propulsion assemblies 20a and 20b are changed according to the gross weight and the COG of the rotorcraft 10.

Figure 8:
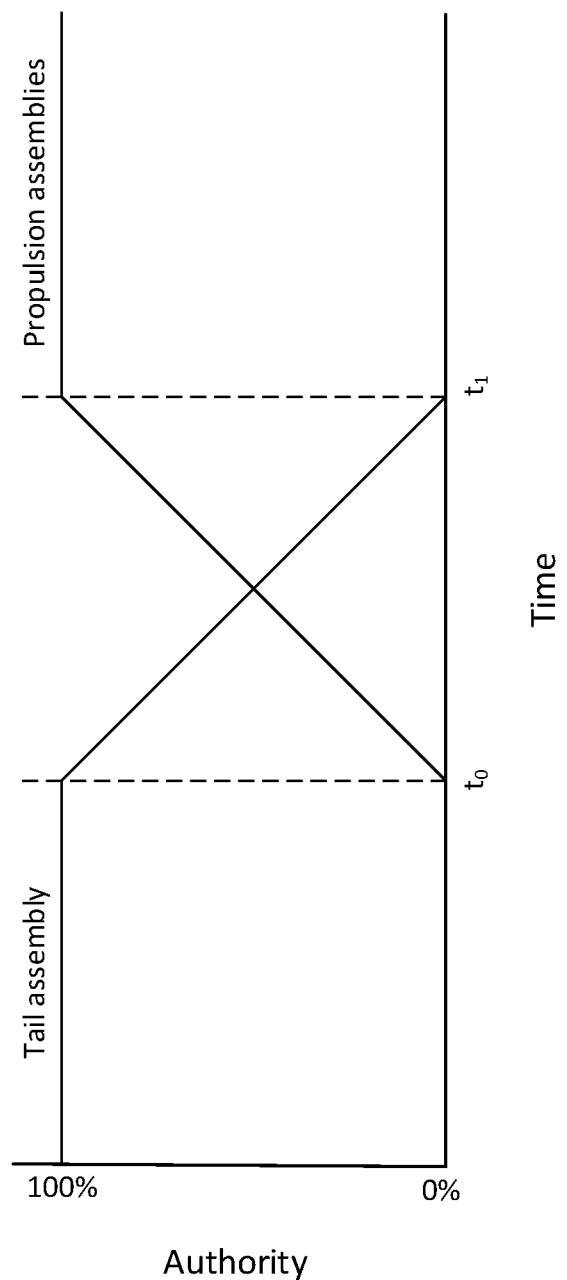
FIG. 8 is a graph showing transition of flight control authority, in accordance with some embodiments.

FIG. 8 is a graph showing the amount of flight control authority exercised by flight control devices of the rotorcraft 10 around axes of the rotorcraft 10, in accordance with some embodiments. During ordinary operation, the tail assembly 16 may exercise some or all of the flight control authority around the principal axis motion axes of the rotorcraft 10. Authority around one or both axes is transitioned to the propulsion assemblies 20a and 20b and/or the proprotor assemblies 26a and 26b in response to detecting a failure of the tail assembly 16. In the illustrated example, a failure is identified at $t_0$ and the transition of authority around one or both axes is initiated. The transition completed at $t_1$. During the transition, both flight control devices exercise partial authority around the transitioned axis or axes. After the transition, some or all of the authority previously exercised by the tail assembly 16 is exercised by the propulsion assemblies 20a and 20b. For example, full control of one or more axes may be offloaded, or only partial control of one or more axes may be offloaded.

In some embodiments, flight control authority around only one axis is transitioned from the tail assembly 16 to the propulsion assemblies 20a and 20b and/or the proprotor assemblies 26a and 26b. The propulsion assemblies 20a and 20b may be more efficient at controlling yaw than pitch. As such, flight control authority around the yaw axis may be transitioned to the propulsion assemblies 20a and 20b, while flight control authority around the pitch axis remains at the tail assembly 16. Yaw control may be a more demanding task than pitch control, and the tail assembly 16 may be capable of performing pitch control even when it is damaged. When flight control authority around the yaw axis is removed from the tail assembly 16, the yaw control may be removed or mix out from the tail, and the tail assembly 16 may only operate in the configurations illustrated in FIGS. 7A and 7B to control pitch.

Figure 9:
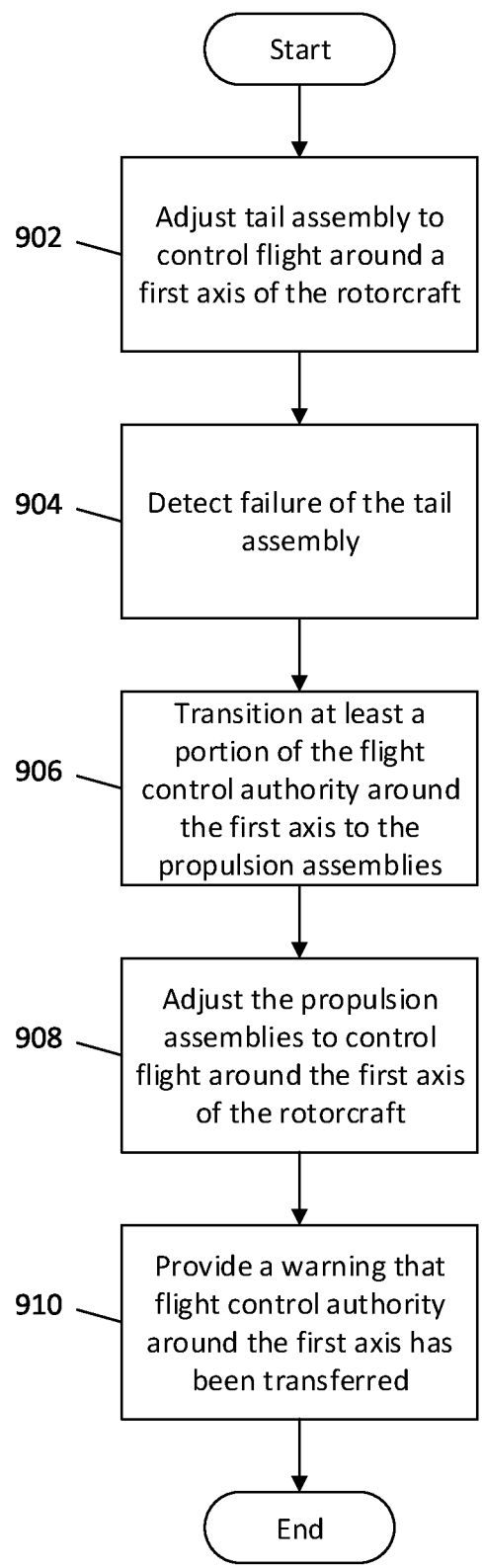
FIG. 9 is a flow diagram of a rotorcraft flight control method, in accordance with some embodiments.

FIG. 9 is a flow diagram of a rotorcraft flight control method 900, in accordance with some embodiments. The rotorcraft flight control method 900 may be performed by the rotorcraft computers 28, such as FCCs. The rotorcraft flight control method 900 may be performed by a tiltrotor aircraft such as the rotorcraft 10, or may be performed by other aircraft such as fixed wing aircraft. Further, although embodiments are described with respect to the tail assembly 16, e.g., a ruddervator, it should be appreciated that embodiments may be applied to other types of tail assemblies. For example, embodiments may be applied to tail assemblies with separate rudders and elevators.

The tail assembly 16 (or more generally, a first flight control device) is adjusted to control flight around a first axis (e.g., the yaw axis) of the rotorcraft 10 (step 902). The tail assembly 16 may also be adjusted to control flight around a second axis (e.g., the pitch axis) of the rotorcraft 10. During this portion of flight, the tail assembly 16 exercises some or all flight control authority around the first axis, and optionally the second axis, of the rotorcraft. In embodiments where the tail assembly 16 is a ruddervator, the flight control device exercises flight control authority around the principal axis motion axes of the rotorcraft 10. In embodiments where the tail assembly 16 is a separate rudder or elevator, the flight control device exercises flight control authority around, respectively, the yaw axis or the pitch axis of the rotorcraft 10.

A failure of the tail assembly 16 is detected (step 904). The failure may be detected in several manners, and the detection method depends on the type of damage to the tail assembly 16. Some types of damages may impede movement of the tail assembly 16. For example, the tail members 16a and 16b may be more difficult to move when the actuators of the tail assembly 16 are damaged. Some types of damages may reduce efficacy of the tail assembly 16. For example, if holes are formed in the tail members 16a and 16b (e.g., by gunfire), the tail members 16a and 16b may continue functioning but the moments they produce around the yaw or pitch axes may be reduced.

When detecting impeded movement of the tail assembly 16, an expected position of the tail members 16a and 16b is compared to an actual position of the tail members 16a and 16b. During flight control, the FCCs command one or both of the tail members 16a and 16b to move to an expected position. The FCCs may do so by sending a control signal to the actuators of the tail assembly 16, commanding them to actuate and cause motion of the tail members 16a and 16b. The actual position of the actuators is then measured. When the actual and expected positons are mismatched (e.g., differ by more than a predetermined amount), the tail assembly 16 is determined as being in a failed state.

When detecting reduced efficacy of the tail assembly 16, an expected performance of the tail members 16a and 16b is compared to an actual performance of the tail members 16a and 16b. The lightweight digital representation 310 (see FIG. 3B) stored at the CAMS 306 (see FIG. 3A) is accessed, and data in the lightweight digital representation 310 is used to determine the expected performance information for the tail assembly 16. The expected performance information may be determined by the fleet management servers 406, using performance and sensor data collected from a fleet of rotorcraft. In particular, the lightweight digital representation 310 is used to determine an expected moment the tail members 16a and 16b should produce around the first axis (e.g., the yaw axis) of the rotorcraft 10. The gross weight and COG indicated by the lightweight digital representation 310 are used to calculate the expected moment. Further, the air temperature and pressure around the rotorcraft 10, as well as the altitude of the rotorcraft 10, may be used to calculate the expected moment. Values for the air temperature, air pressure, and altitude of the rotorcraft 10 may be determined using aircraft sensors. The actual moment produced by the tail members 16a and 16b around the first axis is then measured during flight. The actual moment may be measured by, e.g., an accelerometer, a gyroscope, or the like. When the actual and expected moments are mismatched (e.g., differ by more than a predetermined amount), the tail assembly 16 is determined as being in a failed state.

At least a portion of the flight control authority around the first axis (e.g., the yaw axis) of the rotorcraft 10 is transitioned to the propulsion assemblies 20a and 20b (or more generally, a second flight control device) from the tail assembly 16 (step 906). The transition is performed automatically (e.g., without pilot input) in response to detecting the failure of the tail assembly 16. In embodiments where the tail assembly 16 also controls flight around a second axis (e.g., the pitch axis), the tail assembly 16 may retain flight control authority around the second axis after the transition. Continuing the example where the tail assembly 16 is a ruddervator, flight control authority around the pitch axis may be retained by the tail assembly 16, while flight control authority around the yaw axis is transferred to the propulsion assemblies 20a and 20b.

Transitioning of the flight control authority may be accomplished by a mixer. As noted above, the FCCs may control the tail assembly 16 by sending control signals to the actuators of the tail assembly 16. In some embodiments, the control signals are input to a mixer, which controls the flight control devices (e.g., the tail assembly 16 and/or propulsion assemblies 20a and 20b) depending on which axes each flight control device has flight control authority over. As shown in FIG. 8, the mixer gradually (or abruptly) fades out commands to the tail assembly 16 and gradually (or abruptly) fades in commands to the propulsion assemblies 20a and 20b. In some embodiments, the fade may have a duration on the order of several milliseconds or on the order of several seconds.

After the transition, the propulsion assemblies 20a and 20b are adjusted to control flight around the first axis (e.g., the yaw axis) of the rotorcraft 10 (step 908). During this portion of flight, the propulsion assemblies 20a and 20b exercise some or all of the flight control authority transitioned from the tail assembly 16. Continuing the example where the tail assembly 16 is a ruddervator, flight control authority around the pitch axis may be exercised by the tail assembly 16 while flight control authority around the yaw axis may be exercised by the propulsion assemblies 20a and 20b. When the rotorcraft 10 is a tiltrotor aircraft, the propulsion assemblies 20a and 20b are adjusted by different control processes depending on whether the rotorcraft 10 is being operated in vertical or forward flight mode. The control processes may be modified according to the lightweight digital representation 310 (see FIG. 3B) stored at the CAMS 306 (see FIG. 3A) of the rotorcraft 10.

When the rotorcraft 10 is being operated in vertical flight mode (or more generally, a first flight mode), the propulsion assemblies 20a and 20b are adjusted by differentially adjusting the orientations of the pylon assemblies 24a and 24b (e.g., by a first control process). The amount of difference in the orientations of the pylon assemblies 24a and 24b may be varied according to data in the lightweight digital representation 310 (such as the gross weight and COG), where a greater difference in orientation may be used for a greater gross weight or an offset COG. The amount of difference in the orientations of the pylon assemblies 24a and 24b may also be varied according to sensor data (such as the air temperature or pressure around the rotorcraft 10, and/or the altitude of the rotorcraft 10).

When the rotorcraft 10 is being operated in forward flight mode (or more generally, a second flight mode), the propulsion assemblies 20a and 20b are adjusted by differentially adjusting the thrust produced by the proprotor assemblies 26a and 26b (e.g., by a second control process). Adjusting the produced thrust may include adjusting the collective or cyclic pitches of the proprotor assemblies 26a and 26b, adjusting the rotation speed of the proprotor assemblies 26a and 26b (e.g., but increasing engine throttle), or the like. The amount of difference in the thrust produced by the proprotor assemblies 24a and 24b may be varied according to data in the lightweight digital representation 310 (such as the gross weight and COG), where a greater difference in produced thrust may be used for a greater gross weight or an offset COG. The amount of difference in the orientations of the pylon assemblies 24a and 24b may also be varied according to sensor data (such as the air temperature or pressure around the rotorcraft 10, and/or the altitude of the rotorcraft 10).

It should be appreciated that the rotorcraft 10 may operate in other modes, such as a conversion flight mode between vertical and forward flight modes. A mixer may be used to determine how the propulsion assemblies 20a and 20b are adjusted. In particular, the mixer may be used to fade between the different control processes according to the degree of conversion between the flight modes. In some embodiments, mixing may be performed by the inner loop(s) of the CLAWS. The inner loop(s) may receive genericized commands from the outer loop(s) of the CLAWS, such as commands to change the pitch or yaw. The inner loop(s) may then determine how to effect that command, such as by adjusting the tail members 16a and 16b or the propulsion assemblies 20a and 20b. The inner loop(s) may perform mixing by determining the degree of flight control authority granted to the different flight control or propulsion devices.

A warning is provided that flight control authority around the first axis (e.g., the yaw axis) of the rotorcraft has been transferred to the propulsion assemblies 20a and 20b (step 910). The warning is provided to flight crew, such as the pilot(s), and may be provided in several manners. The warning may be provided as an indicator on a heads-up display, by illuminating an indicator light, by playing a warning tone, or the like.

Figure 10:
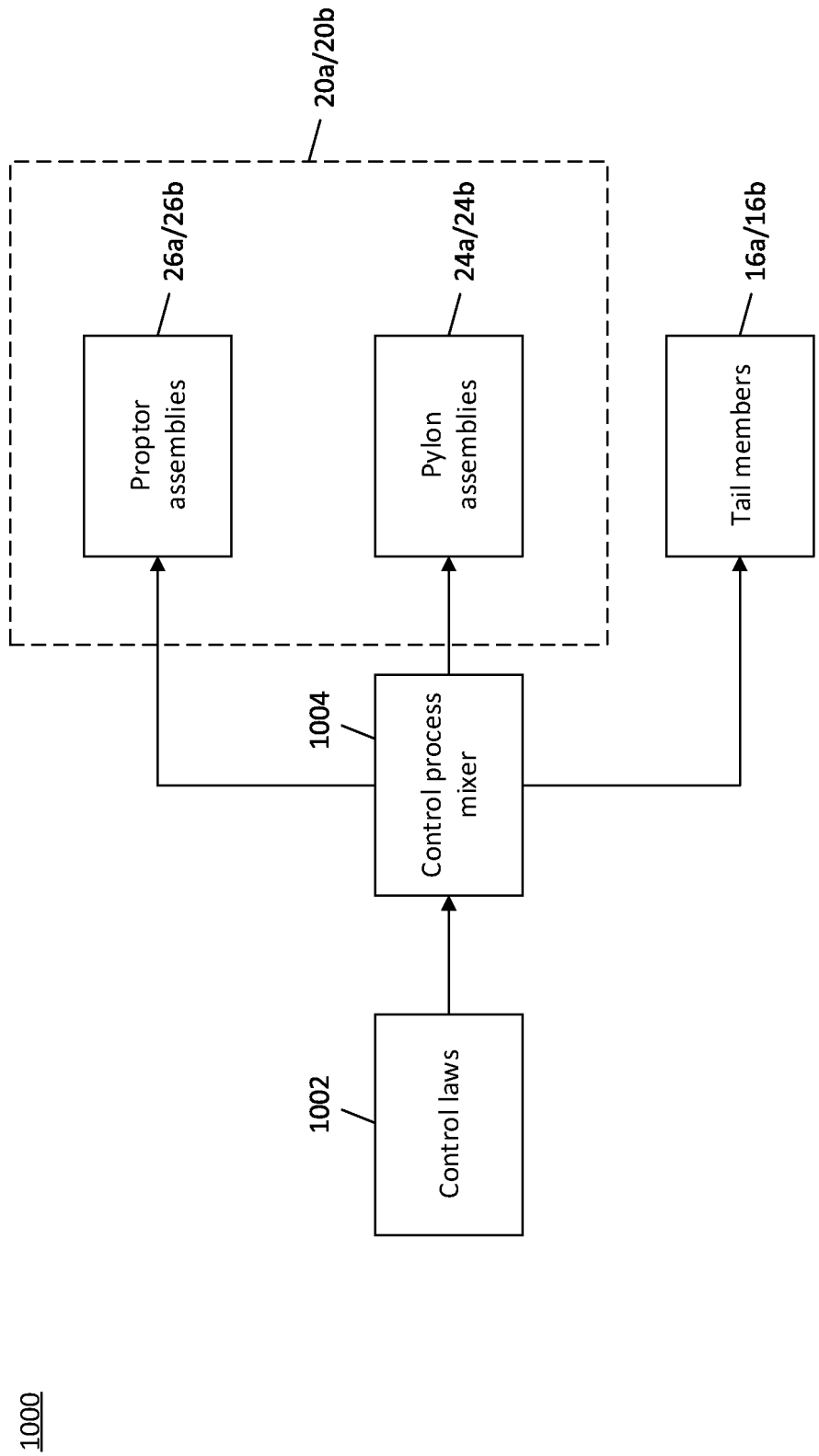
FIG. 10 is a block diagram of a rotorcraft flight control system, in accordance with some embodiments.

FIG. 10 is a block diagram of a rotorcraft flight control system 1000, in accordance with some embodiments. The rotorcraft flight control system 1000 may be implemented by the flight control system 302. In the rotorcraft flight control system 1000, CLAWS 1002 produce control signal(s) for adjusting yaw and/or pitch of the rotorcraft 10. A control process mixer 1004 controls which flight control devices of the rotorcraft 10 have authority to perform the yaw and/or pitch adjustments and generates corresponding control command for the devices. When the tail members 16a and 16b have authority, they are actuated to effect the yaw and/or pitch adjustments. When the proprotor assemblies 26a and 26b have authority, their swashplates can be adjusted to effect the yaw and/or pitch adjustments. When the rotorcraft 10 is in vertical flight mode, the swashplates of the proprotor assemblies 26a and 26b can be changed to effect the yaw and/or pitch adjustments. The adjustment can be symmetric or asymmetric. When the rotorcraft 10 is in forward flight mode, the collective or cyclic pitches of the proprotor assemblies 26a and 26b are differentially adjusted to effect the yaw and/or pitch adjustments. In addition, the authority of control surfaces may be partially or fully offloaded based on the airspeed of the rotorcraft 10. The adjustment can be symmetric or asymmetric.

Although some embodiments are described in the context of offloading control from the tail assembly 16 to the propulsion assemblies 20a and 20b, offloading may be performed for other types of flight control devices. For example, when the rotorcraft 10 is in vertical flight mode, control may also be offloaded from the pylon assemblies 24a and 24b to the swashplates of the proprotor assemblies 26a and 26b. Likewise, control may be offloaded from a first aileron/flaperon on one side of the rotorcraft 10 to a second aileron/flaperon on another side of the rotorcraft 10 in response to the first aileron/flaperon being damaged.

Embodiments may achieve advantages. Transitioning flight control authority from the tail assembly 16 to the propulsion assemblies 20a and 20b and/or the proprotor assemblies 26a and 26b may allow the rotorcraft 10 to continue operation when the tail assembly 16 is damaged. Total failure of the rotorcraft 10 may thus be avoided when some components are damaged. Further, transitioning flight control authority may allow a damaged rotorcraft to be operated in a reduced capacity. For example, if a rotorcraft is damaged in combat, the rotorcraft may be flown to safety by using the propulsion assemblies 20a and 20b and/or the proprotor assemblies 26a and 26b for yaw and/or pitch control. Because the individualized equipment data contains detailed configuration information for the rotorcraft 10, the rotorcraft 10 may be more accurately controlled.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
adjusting a first flight control device of a rotorcraft to control flight around a first axis of the rotorcraft, the first flight control device exercising flight control authority around the first axis of the rotorcraft;
detecting a failure of the first flight control device;
transitioning the flight control authority around the first axis of the rotorcraft from the first flight control device to a second flight control device of the rotorcraft, the transitioning being performed automatically in response to detecting the failure of the first flight control device; and adjusting the second flight control device to control flight around the first axis of the rotorcraft, the second flight control device being adjusted by a first control process when the rotorcraft is in a first flight mode, the second flight control device being adjusted by a second control process when the rotorcraft is in a second flight mode.

2. The method of claim 1, wherein the first flight control device is a flight control surface disposed on an exterior of the rotorcraft.

3. The method of claim 2, wherein the flight control surface comprises a ruddervator.

4. The method of claim 1, wherein the second flight control device is a propulsion assembly.

5. The method of claim 1, wherein the first flight mode is a vertical flight mode, and the second flight mode is a forward flight mode.

6. The method of claim 1, wherein detecting the failure of the first flight control device comprises:

accessing individualized equipment data for the rotorcraft, the individualized equipment data being stored at a computer of the rotorcraft;

determining an expected performance of the first flight control device according to the individualized equipment data;

measuring actual performance of the first flight control device during flight of the rotorcraft; and determining the first flight control device has failed in response to the actual performance of the first flight control device being less than the expected performance of the first flight control device.

7. The method of claim 6, wherein the individualized equipment data indicates the center of gravity of the rotorcraft, and wherein the expected performance of the first flight control device is determined according to the center of gravity of the rotorcraft.

8. The method of claim 6, wherein the individualized equipment data indicates the weight of the rotorcraft, and wherein the expected performance of the first flight control device is determined according to the weight of the rotorcraft.

9. The method of claim 6 further comprising:

collecting usage and maintenance data for the rotorcraft at the computer of the rotorcraft;

sending the usage and maintenance data to a fleet management server;

receiving the individualized equipment data from the fleet management server; and persisting the individualized equipment data at the computer of the rotorcraft.

10. The method of claim 1, wherein detecting the failure of the first flight control device comprises:

commanding the first flight control device to move to an expected position;

measuring an actual position of the first flight control device after the commanding; and determining the first flight control device has failed in response to the actual position of the first flight control device being mismatched with the expected position of the first flight control device.

11. A rotorcraft comprising:

a fuselage;

a ruddervator mounted at an aft end of the fuselage;

a plurality of propulsion assemblies mounted at a forward end of the fuselage; and a flight control computer coupled to the ruddervator and the propulsion assemblies, the flight control computer being configured to:

adjust the ruddervator to control flight around a yaw axis and a pitch axis of the rotorcraft, the ruddervator exercising flight control authority around the yaw axis and the pitch axis of the rotorcraft;

transition the flight control authority around the yaw axis of the rotorcraft from the ruddervator to the propulsion assemblies, the transitioning being performed automatically in response to detecting a failure of the ruddervator, the ruddervator retaining flight control authority around the pitch axis of the rotorcraft after the transition; and adjust the propulsion assemblies to control flight around the yaw axis of the rotorcraft, the propulsion assemblies being adjusted by a first control process when the rotorcraft is in a vertical flight mode, the propulsion assemblies being adjusted by a second control process when the rotorcraft is in a forward flight mode.

12. The rotorcraft of claim 11, further comprising:

a configuration and maintenance computer coupled to the flight control computer, the configuration and maintenance computer being configured to:

collect usage and maintenance data for the rotorcraft;

send the usage and maintenance data to a fleet management server;

receive individualized equipment data for the rotorcraft from the fleet management server; and persist the individualized equipment data.

13. The rotorcraft of claim 12, wherein the flight control computer is further configured to:

access the individualized equipment data at the configuration and maintenance computer;

determine an expected moment the ruddervator should produce around the yaw axis of the rotorcraft, the expected moment being determined according to the individualized equipment data for the rotorcraft;

measure an actual moment the ruddervator produces around the yaw axis of the rotorcraft during flight of the rotorcraft; and determine the ruddervator has failed in response to the actual moment around the yaw axis of the rotorcraft being less than the expected moment around the yaw axis of the rotorcraft.

14. The rotorcraft of claim 13, wherein the individualized equipment data indicates the center of gravity of the rotorcraft, and wherein the flight control computer is configured to determine the expected moment the ruddervator should produce around the yaw axis of the rotorcraft according to the center of gravity of the rotorcraft.

15. The rotorcraft of claim 13, wherein the individualized equipment data indicates the weight of the rotorcraft, and wherein the flight control computer is configured to determine the expected moment the ruddervator should produce around the yaw axis of the rotorcraft according to the weight of the rotorcraft.

16. The rotorcraft of claim 11, wherein the flight control computer is further configured to:

command the ruddervator to move to an expected position;

measure an actual position of the ruddervator; and determining the ruddervator has failed in response to the actual position of the ruddervator being mismatched with the expected position of the ruddervator.

17. The rotorcraft of claim 11, wherein the propulsion assemblies comprise pylon assemblies, and wherein during the first control process the flight control computer is configured to:

adjust orientations of the pylon assemblies differentially.

18. The rotorcraft of claim 11, wherein the propulsion assemblies comprise proprotor assemblies, and wherein during the second control process the flight control computer is configured to:

adjust pitches of the proprotor assemblies differentially.

19. The rotorcraft of claim 11, wherein the flight control computer is configured to transition only a portion of the flight control authority exercised by the ruddervator to the propulsion assemblies.

20. The rotorcraft of claim 11, wherein the flight control computer is configured to transition all of the flight control authority exercised by the ruddervator to the propulsion assemblies.

21. A rotorcraft comprising:

a ruddervator;

a plurality of propulsion assemblies;

a configuration and maintenance computer configured to store individualized equipment data for the rotorcraft; and a flight control computer coupled to the ruddervator, the propulsion assemblies, and the configuration and maintenance computer, the flight control computer being configured to:

adjust the ruddervator to control flight around a first axis of the rotorcraft, the ruddervator exercising flight control authority around the first axis of the rotorcraft;

detect a failure of the ruddervator according to the individualized equipment data for the rotorcraft;

transition the flight control authority around the first axis of the rotorcraft from the ruddervator to the propulsion assemblies, the transitioning being performed automatically in response to detecting the failure of the ruddervator; and adjust the propulsion assemblies to control flight around the first axis of the rotorcraft, the propulsion assemblies being adjusted according to the individualized equipment data for the rotorcraft.

22. The rotorcraft of claim 21 further comprising:

a temperature sensor coupled to the flight control computer;

a pressure sensor coupled to the flight control computer; and an altitude sensor coupled to the flight control computer, wherein the flight control computer is configured to detect the failure of the ruddervator according to the individualized equipment data for the rotorcraft, a temperature value measured with the temperature sensor, a pressure value measured with the pressure sensor, and an altitude value measured with the altitude sensor.

23. The rotorcraft of claim 22, wherein the flight control computer is configured to adjust the propulsion assemblies according to the individualized equipment data for the rotorcraft, the temperature value measured with the temperature sensor, the pressure value measured with the pressure sensor, and the altitude value measured with the altitude sensor.

* * * * *